(12) United States Patent
Lu et al.

(10) Patent No.: US 8,993,693 B2
(45) Date of Patent: Mar. 31, 2015

(54) ETHYLENE COPOLYMERS WITH A NOVEL COMPOSITION DISTRIBUTION AND PROCESSES FOR MAKING THE SAME

(75) Inventors: Honglan Lu, Port Lavaca, TX (US); Guangxue Xu, Port Lavaca, TX (US)

(73) Assignee: Formosa Plastics Corporation, Livingston, NJ (US)

( * ) Notice: Subject to any disclaimer, the term of this patent is extended or adjusted under 35 U.S.C. 154(b) by 11 days.

(21) Appl. No.: 13/429,013

(22) Filed: Mar. 23, 2012

(65) Prior Publication Data

US 2013/0253150 A1  Sep. 26, 2013

(51) Int. Cl.
C08F 210/16 (2006.01)
C08F 2/34 (2006.01)
C08F 4/605 (2006.01)

(52) U.S. Cl.
CPC ................... C08F 4/6055 (2013.01)
USPC ....... 526/90; 526/119; 526/348.2; 526/348.5; 526/348.6; 526/127; 526/129; 526/124.1; 502/104; 502/120; 502/155

(58) Field of Classification Search
USPC ................. 526/90, 119, 124.1, 348.2, 348.5, 526/348.6, 127, 129; 502/104, 120, 155
See application file for complete search history.

(56) References Cited

U.S. PATENT DOCUMENTS

| | | | |
|---|---|---|---|
| 4,438,238 A | 3/1984 | Fukushima et al. | |
| 4,612,300 A | 9/1986 | Coleman, III | |
| 4,935,474 A | 6/1990 | Ewen et al. | |
| 4,937,299 A | 6/1990 | Ewen et al. | |
| 5,858,491 A | 1/1999 | Geussens et al. | |
| 6,172,173 B1 | 1/2001 | Spencer et al. | |
| 6,355,359 B1 | 3/2002 | Sukhadia et al. | |
| 6,713,189 B2 | 3/2004 | Ho et al. | |
| 6,887,817 B2 | 5/2005 | Lu et al. | |
| 6,956,003 B2 | 10/2005 | Kong et al. | |
| 6,992,034 B2 | 1/2006 | Xu et al. | |
| 7,211,534 B2 | 5/2007 | Lu et al. | |
| 7,307,036 B2 | 12/2007 | Xu et al. | |
| 7,582,712 B1 | 9/2009 | Xu et al. | |
| 7,618,913 B2 | 11/2009 | Xu et al. | |
| 7,619,049 B1 | 11/2009 | Fang et al. | |
| 7,651,969 B2 | 1/2010 | Kong et al. | |
| 7,718,713 B2 | 5/2010 | Shih et al. | |
| 7,790,819 B1 | 9/2010 | Fang et al. | |
| 2003/0130108 A1* | 7/2003 | Jaber ............................. 502/103 |
| 2009/0105397 A1 | 4/2009 | Van Riel et al. | |
| 2009/0105417 A1 | 4/2009 | Walton et al. | |
| 2012/0101242 A1 | 4/2012 | Crowther | |

FOREIGN PATENT DOCUMENTS

WO  WO 90/03414  4/1990

OTHER PUBLICATIONS

PCT Search Report and Written Opinion, Serial No. PCT/US2013/033506, issued by the European Patent Office as the International Searching Authority, Sep. 4, 2013, 9 pages.

* cited by examiner

Primary Examiner — Robert D. Harlan
(74) Attorney, Agent, or Firm — Jones Walker LLP

(57) ABSTRACT

A Ziegler-Natta catalyzed ethylene copolymer having a novel composition distribution in which comonomers are incorporated into the high molecular weight polymer molecules and distributed evenly among the entire polyethylene chains, and a method for making the same are provided. The resins having a novel composition distribution have controlled molecular weight distribution which is narrower than conventional ZN-ethylene copolymers but broader than single-site catalyzed ethylene copolymers. The resins having a novel composition distribution exhibit a superior tear strength and impact strength.

21 Claims, 5 Drawing Sheets

ETHYLENE COPOLYMERS WITH A NOVEL COMPOSITION DISTRIBUTION AND PROCESSES FOR MAKING THE SAME

BACKGROUND OF THE INVENTION

1. Field of the Invention

The present invention relates to Ziegler-Natta (ZN) catalyzed ethylene-alpha olefin copolymers having densities of about 0.870 g/cc or higher, processes for making the same, and articles made of this new composition.

2. Description of the Related Art

Various types of polyethylene are known in the art. Low density polyethylene (LDPE) is generally prepared at high pressure using free radical initiators and typically has a density in the range of 0.9100-0.9400 g/cc. High density polyethylene (HDPE) usually has a density in the range of 0.9400 to 0.9600 g/cc, which is prepared with Ziegler-Natta type catalysts or single-site type catalysts (such as metallocene catalysts) at low or moderate pressures. HDPE is generally polymerized without comonomer, or alternatively with a small amount of comonomers with fewer short chain branches (SCB) than LLDPE. Linear low density polyethylene (LLDPE) is generally prepared in the same manner as HDPE, except it incorporates a relatively higher amount of alpha-olefin comonomers. By way of example, comonomers such as 1-butene, 1-hexene, or 1-octene are used to incorporate enough SCB into the otherwise linear polymers to depress the density of resultant polymers into the range of that of LDPE.

Conventional Ziegler-Natta catalyzed polyethylene copolymers such as LLDPE have both a relatively broad molecular weight distribution and a relatively broad comonomer distribution in which the comonomers are predominately incorporated into the low molecular weight polymer molecules or short polyethylene chains whereas the long polyethylene chains or high molecular weight polymer molecules do not contain a meaningful amount of comonomers. In other words, the conventional Ziegler-Natta catalyzed ethylene copolymers exhibit a heterogeneous SCB distribution among polymer chains of different molecular weight. This lack of compositional homogeneity is associated with several disadvantages including "organoleptic" problems caused by low molecular weight material and suboptimal impact strengths which are believed to be caused by the crystallinity of the homopolymer fraction.

Single-site catalysts normally produce resins with a narrow composition distribution in which comonomers are substantially uniformly distributed among the polymer chains of different molecular weight. As a result, both short chain branch distribution and polymer chain distribution of single-site catalyzed copolymers are known to be homogeneous.

It is well known that composition distribution affects the properties of copolymers. For example, extractable content, tear strength, dart impact, heat sealing strength, and environmental stress crack resistance (ESCR) can all be affected by composition distribution. Conventional Ziegler-Natta catalyzed LLDPE exhibiting a broad composition distribution and broad molecular weight distribution is known to have good processability as measured by extruder pressures and motor load. In film applications, conventional Ziegler-Natta catalyzed LLDPE (ZN LLDPE) exhibits good physical properties as related to tensile and tear strengths, but shows low dart drop impact strength. Single-site catalyzed LLDPE (mLLDPE), having a narrow composition distribution and narrow molecular weight distribution, is known to produce tough films with high dart impact and puncture properties. But the single-site catalyzed LLDPE exhibits adverse processability and weak film tensile properties (e.g. MD tear strength).

As such, it is highly desirable to attain polyethylene resins that exhibit ZN LLDPE type processability and a tear strength that is higher than or equivalent to ZN LLDPE, and a dart impact strength which is comparable to or better than that of mLLDPE. Theoretically, it is possible to improve the toughness of films (e.g. MD tensile strength) by increasing the amount of orientation in the machine direction during film fabrication. However, conventional knowledge in the polyethylene film art suggests that by increasing the machine direction (MD) orientation in films during manufacturing, other physical properties, such as MD tear strength, will significantly decrease.

Certain advantages were known in the prior art regarding super-hexene ZN LLDPE for enhancing toughness properties such as dart impact while maintaining the MD tear of conventional ZN LLDPE. The molecular weight distribution of super-hexene LLDPE is narrower than that of conventional ZN polymers but the composition distribution still resembles that conventional ZN LLDPE. As a result, the dart impact strength is still noticeably lower than that of single-site catalyst-based LLDPE.

Therefore, there is a need for a new LLDPE composition that would exhibit a balance of good processability and desirable physical properties. The resins of the present invention were found to match these requirements, exhibiting a MD tear strength that is higher than that of super-hexene ZN LLDPE and a dart impact strength which is comparable to or better than that of mLLDPE.

SUMMARY OF THE INVENTION

A Ziegler-Natta catalyzed ethylene copolymer having a novel composition distribution with superior physical properties, a process for making the same, and articles made of this composition are provided. The resins of the present invention exhibit a distinctive molecular structure encompassing all the desirable attributes of both ZN catalyzed copolymers and single-site catalyzed copolymers. In one embodiment of the present invention, the resins of the present invention exhibit a distinctive molecular structure in which comonomers are incorporated into the high molecular weight polymer molecules and distributed evenly among the entire polyethylene chains with substantial absence of low molecular weight polymer molecules. The resins of the present invention exhibit a global composition distribution that is comparable to typical single-site catalyzed polymers, with a distinctive melting behavior which differs substantially from that of the single-site catalyst. The resins having a novel composition distribution of this invention exhibit a melting point of about 125° C. over the density range of 0.9140 to 0.9250 g/cc, which is substantially higher in comparable density and narrower for a given range than those of the single-site catalyyzed copolymers respectively. The resins of the present invention have a controlled molecular weight distribution which is narrower than conventional ZN-copolymers but broader than single-site catalyzed copolymers. The resins of the present invention are characterized by side chain structure sequence analysis with $^{13}$C-NMR experimentation, by short chain branching distribution across molecule weight distribution with high temperature GPC coupling with FTIR detector, by molecular weight and comonomer content analysis of each fraction obtained from Temperature Rising Elution Fractionation (TREF) experiments with GPC and FTIR or $^{13}$C-NMR, by molecular weight distribution (Mw/Mn) in GPC experiment, by polymer crystallinity and melting point analysis with DSC experiment, and by film physical properties analysis in blown film lines.

In another embodiment, a process to produce this novel copolymer may include polymerizing ethylene and at least one alpha-olefin by contacting the ethylene and at least one alpha-olefin with a Ziegler-Natta type catalyst in a gas phase reactor at a reactor pressure of between 0.5 and 70 bar and a reactor temperature of between 20° C. and 150° C. to form an ethylene alpha-olefin copolymer. The resulting ethylene alpha-olefin copolymer may have a density of 0.870 g/cc or higher, a melt index ratio ($I_{21}/I_2$) between 10 and 50, a molecular weight distribution (Mw/Mn) of 2.5-8.0 and a ratio (Mz/Mw) of z-average molecular weight (Mz) to weight average molecular weight (Mw) of greater than 2.5, and a novel short chain branch distribution.

In yet another embodiment, polyethylene films having superior physical properties and methods for making the same are provided. Resins made according to this invention that are fabricated into films or sheets by means of various conversion processes, including but not limited to blown film and cast film processes, have the processability, stiffness and tear strength of conventional copolymers combined with the dart impact and toughness strength of single-site catalyzed copolymers.

In yet another embodiment, the resins having a novel composition distribution of this invention exhibit a unique correlation between polymer density and polymer melting point. This correlation was found to be substantially more level than that of the single-site catalyzed copolymers. Such a unique melting point profile would make the products of this novel composition distribution withstand more reactor upsets and provide a more stable operation in a gas phase reactor. The resins of the present invention exhibit a melting point range of about 124° C. to about 126° C. for LLDPE polymer, which is substantially higher than that of the single-site catalyzed copolymers of comparable density.

DETAILED DESCRIPTION

Figure 1:
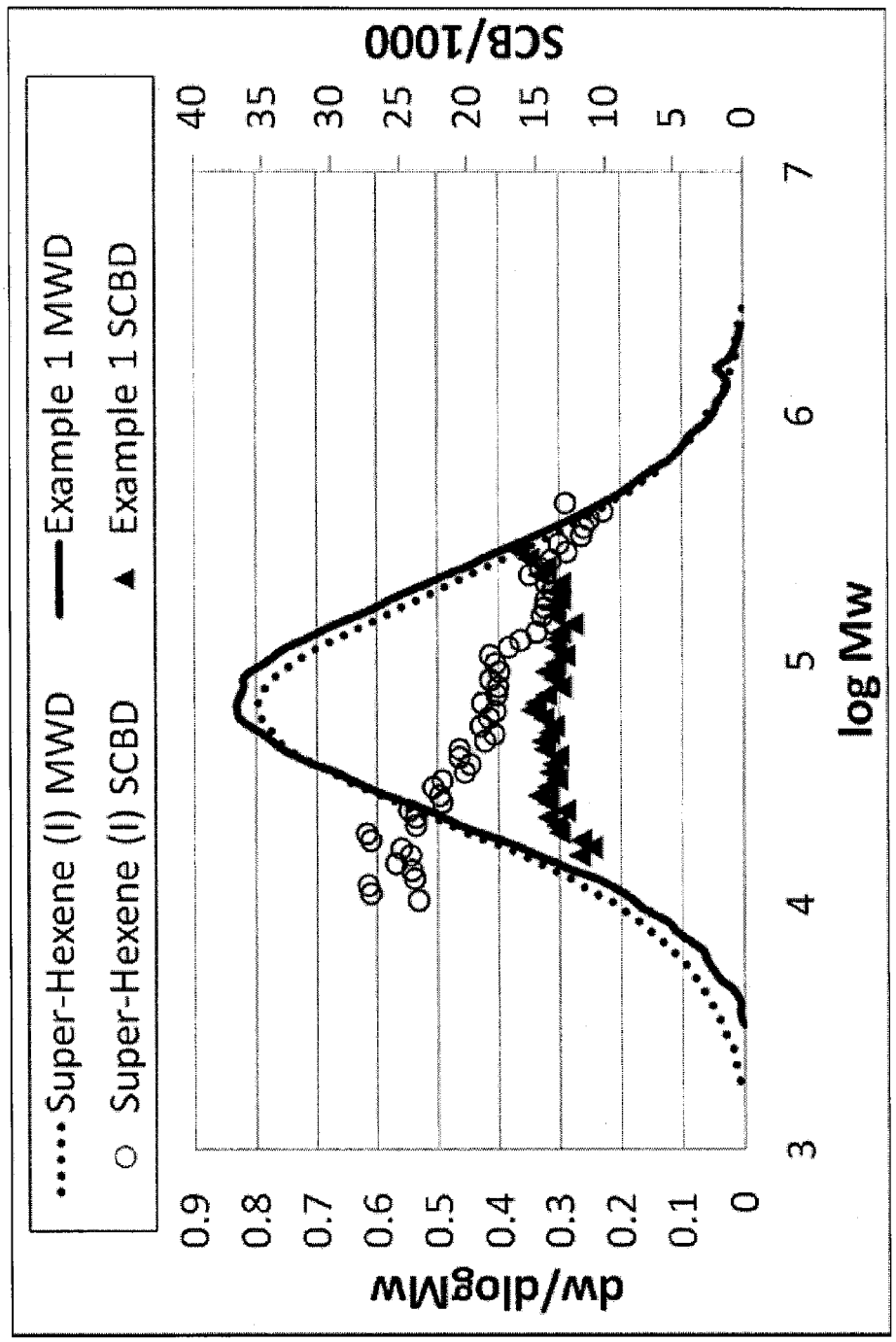
FIG. 1 presents the novel short chain branching distribution (SCBD) of Sample 1 and that of commercial superhexene ZN LLDPE.

The present invention relates to the production of Ziegler-Natta catalyzed ethylene alpha-olefin copolymers with a novel composition distribution which substantially combine the desirable attributes of ZN catalyzed copolymers and single-site catalyzed copolymers. The resins of the present invention exhibit a composition distribution which is comparable to single-site catalyzed copolymers but accompanied with a distinctive melting behavior which differs substantially from that of the single-site catalyzed copolymers. The resins of the present invention have a controlled molecular weight distribution which is narrower than conventional ZN copolymers but broader than single-site catalyzed copolymers.

The present invention also relates to Ziegler-Natta catalysts and polymerization processes for producing a Ziegler-Natta polyethylene having a density of about 0.870 g/cc or higher with balanced composition distribution as well as superior physical properties. The resulting ethylene alpha-olefin copolymers exhibit a desirable balance of processability and physical properties. The resins of the present invention exhibit a tear strength which is higher than ZN copolymers and a dart impact strength which is comparable to or better than single-site catalyzed copolymers.

In another embodiment, the resins of the present invention exhibit a unique correlation between polymer density and polymer melting point which is substantially more level than that of the single-site catalyst. Such a unique profile would make products of this novel composition withstand more reactor upsets and provide a more stable operation in a gas phase reactor. The resins of the present invention exhibit a melting point range of about 124° C. to about 126° C. for LLDPE polymers, which is substantially higher than that of the mLLDPE of comparable density.

In yet another embodiment, the resins of the present invention have a molecular weight distribution, a weight average molecular weight to number average molecular weight ($M_w/M_n$) of greater than 2.5 to about 8.0, particularly greater than 2.5 to about 4.5, more preferably between about 3.0 to about 4.0, and most preferably between about 3.2 to about 3.8. The polymers have a ratio (Mz/Mw) of z-average molecular weight (Mz) to weight average molecular weight of greater than 2.5. This ratio is preferably between about 2.5 to about 3.8, more preferably between about 2.5 to about 3.5, and most preferably between about 2.5 to about 3.0.

Composition Distribution and Film Properties

The composition distribution of an ethylene alpha-olefin copolymer refers to the distribution of comonomers among the molecules (short chain branch distribution) that comprise the polyethylene polymers. Conventional Ziegler-Natta catalysts and chromium based catalysts, owing to the nature of their multiple active sites, typically produce resins having both broad molecular weight distribution and broad composition distribution. These conventional Ziegler-Natta and chromium-based broad composition distribution resins are further characterized by comonomers incorporated predominantly in low molecular weight chains. Therefore, resins made with conventional Ziegler-Natta type catalysts have good processability, high stiffness and tear strength, but weak film toughness properties (e.g. dart impact and puncture properties). Examples are described in U.S. Pat. Nos. 4,438,238; 4,612,300; 6,172,173, 6,713,189; and 6,355,359.

Certain Single-site catalysts are capable of producing resins with narrow composition distribution in which the comonomer content is substantially uniform among the polymer chains of different molecular weight. These Single-site based narrow composition distribution resins are further characterized by a very narrow molecular weight distribution. Both short chain branch distribution and polymer chain distribution are homogeneous due to the fact that comonomers are uniformly distributed among polymers of different molecular weight. These mLLDPEs, having both narrow composition distribution and narrow molecular weight distribution, are known to produce tough films with high dart impact and puncture properties but "poor" processability, low stiffness, and low tear strength. Examples are described in U.S. Pat. Nos. 4,937,299; 4,935,474; and WO 90/03414.

A novel composition distribution and a process for making the same are provided in this invention. The resins of the present invention exhibit, in addition to good processability, a superior balance of physical properties such as stiffness and tear strength of ZN copolymers coupled with the dart impact and other toughness strength of a single-site catalyzed copolymers. More specifically, the resins of the present invention exhibit a distinctive molecular structure in which comonomers are incorporated into the high molecular weight polymer molecules and distributed evenly among the entire polyethylene chains with substantial absence of low molecular weight polymer molecules. The of the present invention exhibit a composition distribution which is comparable to single-site catalyzed copolymers but with a distinctive melting behavior that differs substantially from that of the single-site catalyst. The resins of the present invention exhibit a melting point of about 125° C. over the density range of 0.9140 to 0.9250 g/cc, which is substantially higher in comparable density and narrower for a given range than those of mLLDPE. The resins of the present invention have a controlled molecular weight distribution which is narrower than conventional ZN catalyzed copolymers but broader than single-site catalyzed copolymers.

Figure 2:
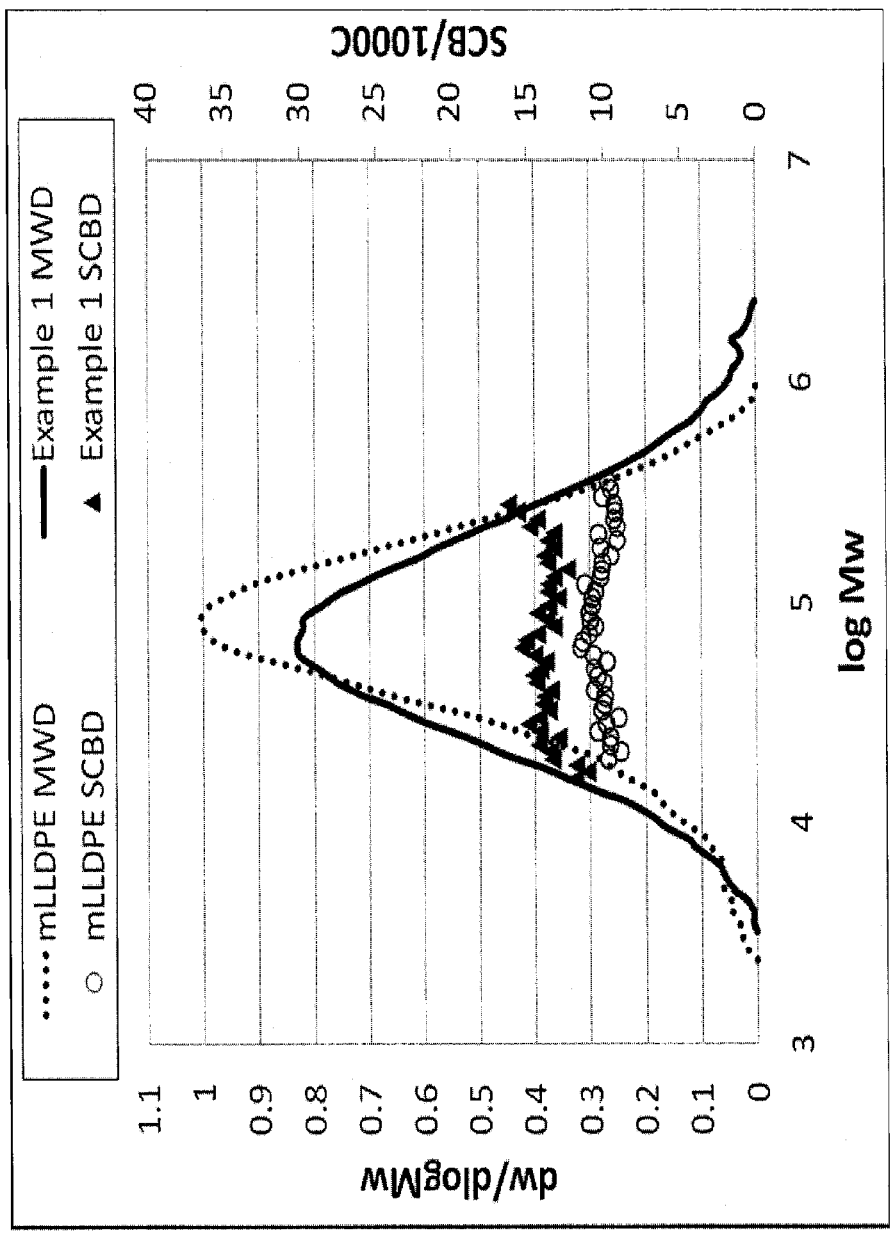
FIG. 2 presents the novel short chain branching distribution (SCBD) of Sample 1 and that of commercial mLLDPE.
Figure 3:
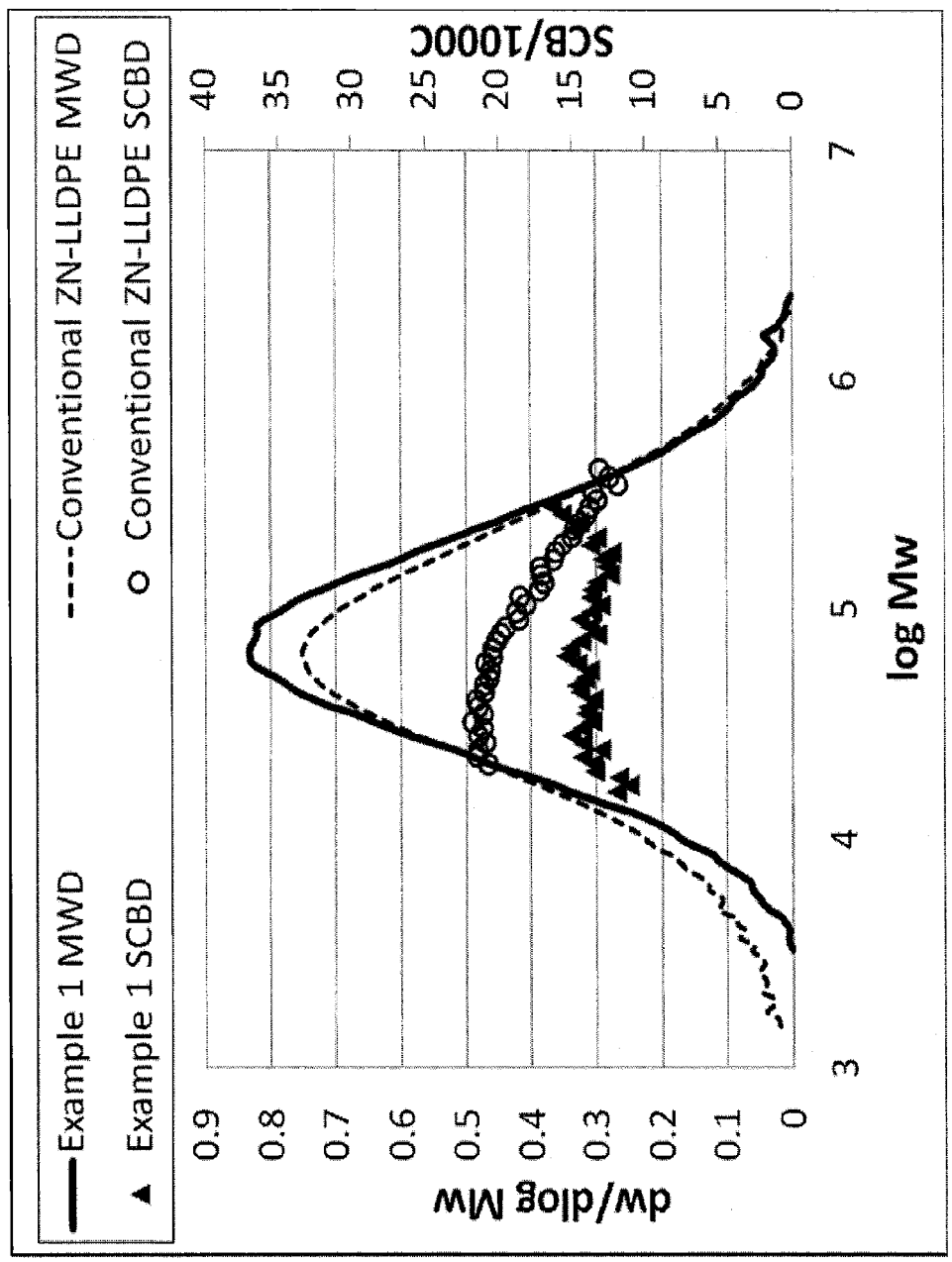
FIG. 3 presents the novel short side chain branching distribution (SCBD) of Sample 1 and that of conventional ZN LLDPE.
Figure 4:
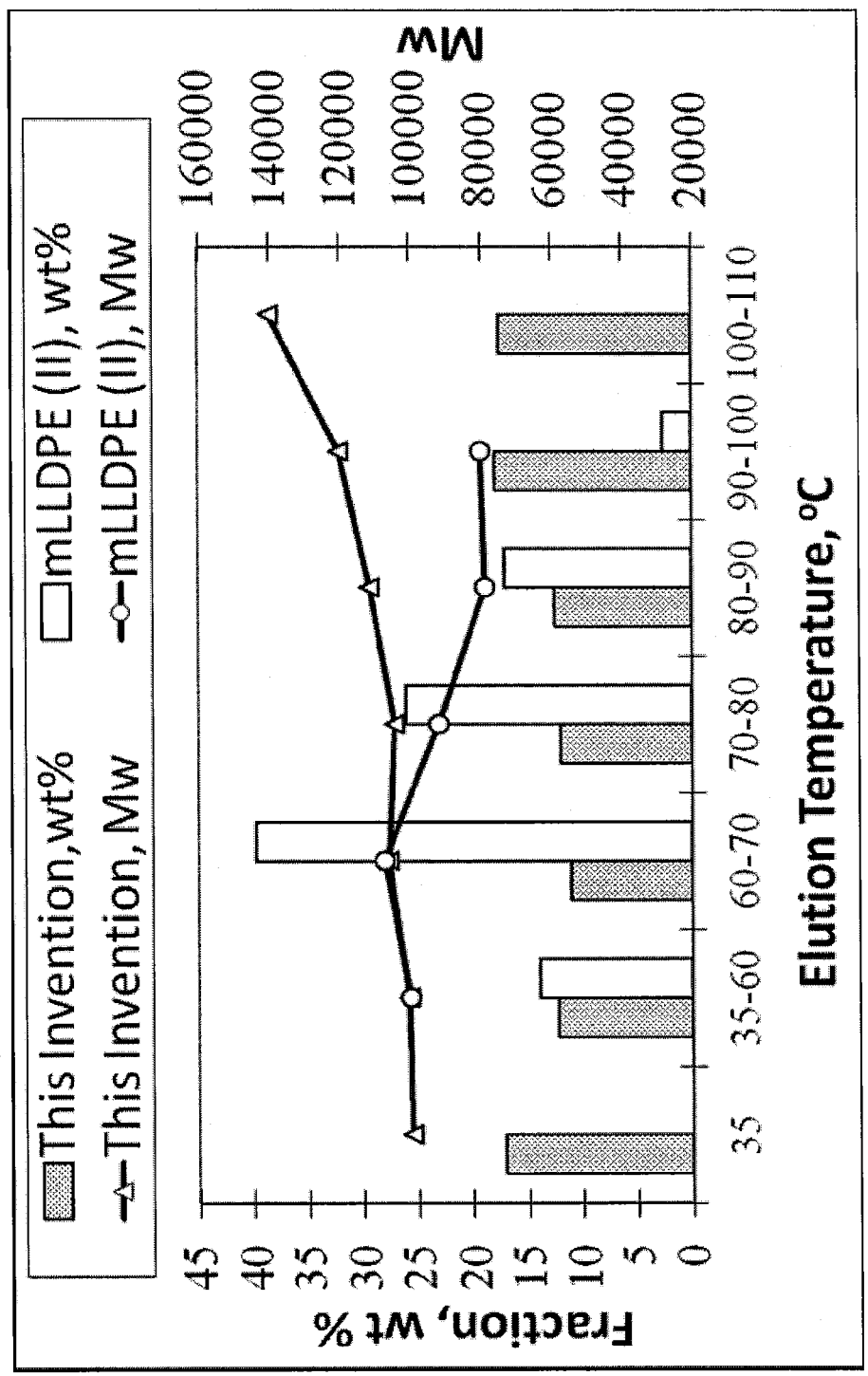
FIG. 4 presents the TREF soluble fractions over weight average molecular weight (Mw) of LLDPE of this invention to that of mLLDPE.
Figure 5:
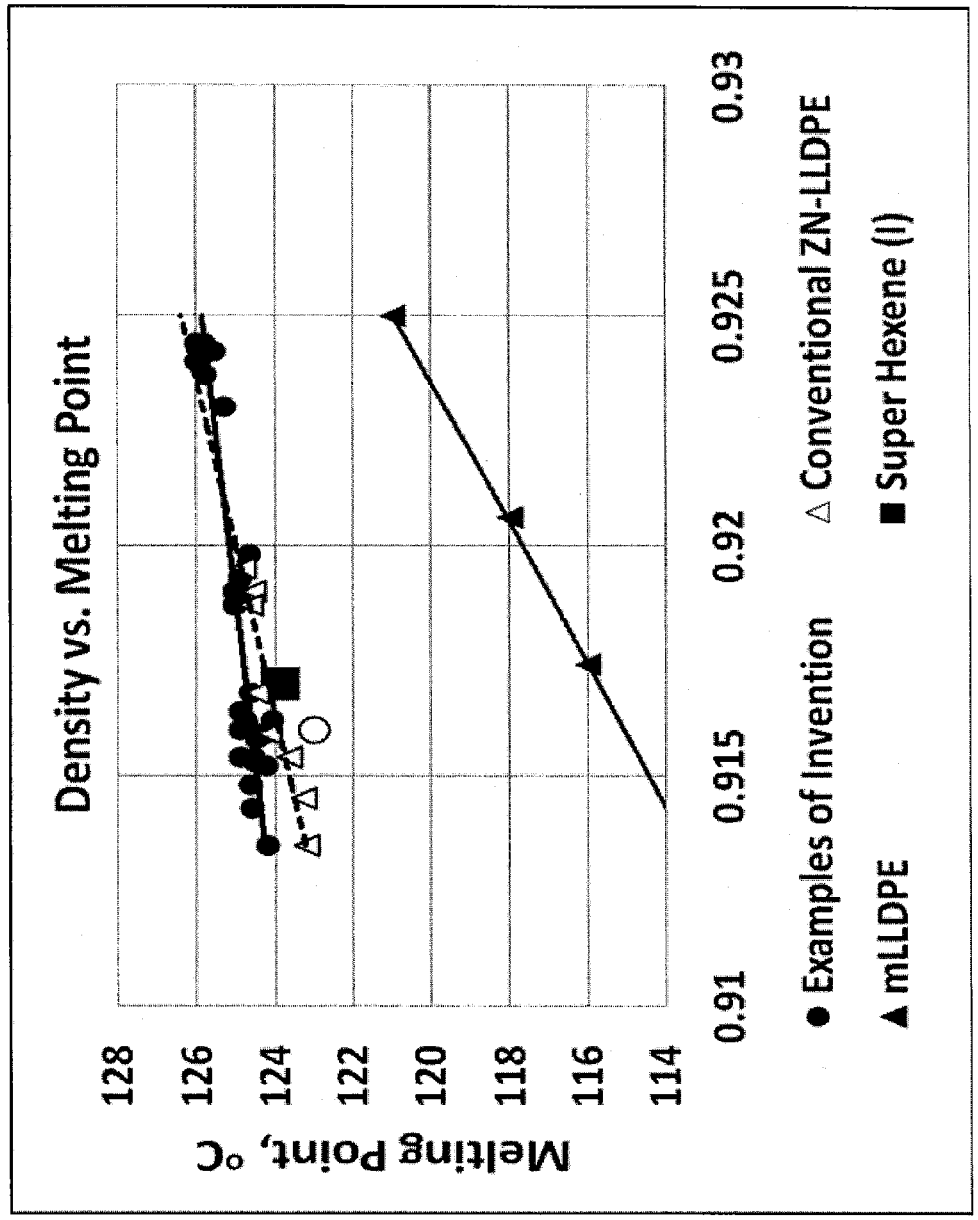
FIG. 5 compares the melting point over density of the present invention to those of conventional ZN LLDPE, superhexene ZN LLDPE, and mLLDPE.

The distribution of the short chain branches can be measured, for example, using Temperature Raising Elution Fractionation (TREF) in connection with a Light Scattering (LS) detector in GPC to determine the weight average molecular weight of the molecules eluted from the TREF. The combination of TREF and GPC-LS and FTIR yields information about the breadth of the composition distribution and whether the comonomer contents increases, decreases, or is uniform across the chains of different molecular weights. The resins of the present invention have "balanced" short chain branch distribution as shown in FIG. 1, FIG. 2 and FIG. 3, which are comparable to mLLDPE but differ from super-hexene ZN LLDPE as well as conventional ZN LLDPE. However, as shown in FIG. 4, the resins of the present invention exhibit a TREF fractionation distribution which is noticeably different from that of mLLDPE. The resins of the present invention display a broader and more evenly distributed TREF fractionation distribution than that of single-site catalysts. But unlike conventional LLDPE, the molecular weight (Mw) of each TREF soluble fraction of this invention was found comparable among one another and with substantial absence of low molecular weight polymer molecules. As shown in FIG. 5, the resins of the present invention exhibit a unique correlation between polymer density and polymer melting point which is comparable to conventional LLDPE but substantially more level than that of mLLDPE.

The polyethylene films having a superior balance of physical properties and a method for making the same are provided herein. Resins of the present invention that are fabricated into films or sheets by means of various conversion processes including, but not limited to, blown film and cast film processes, have the processability, stiffness and tear strength of a conventional ZN catalyzed copolymers combined with the dart impact and toughness strength of single-site catalyzed copolymers.

Catalyst Components and Catalyst Systems

The catalyst as described herein is an advanced Ziegler-Natta catalyst which was modified with non-single-site catalyst ligands and/or interior donor with a strong Lewis base such as aromatic compounds containing nitrogen atom. Examples are described in U.S. Pat. Nos. 6,992,034 and 7,618,913.

In one embodiment, the following process may be performed in-situ to form a catalyst precursor. The process includes combining magnesium metal; a compound having the formula $R^1_m Si(OR^2)_n$, wherein $R^1$ and $R^2$ are $C_1$-$C_{20}$ hydrocarbyl, m=0-3, n=1-4, and m+n=4, and wherein each $R^1$ and each $R^2$ may be the same or different; a compound having the formula $R^3_x SiX_y$, wherein $R^3$ is $C_1$-$C_{20}$ hydrocarbyl, X is halogen, x=0-3, y=1-4, and x+y=4, and wherein each X and each $R^3$ may be the same or different; a compound having the formula $MX_4$, wherein M is a early transition metal such as Ti, Zr, or V; a compound having the formula $M(OR^4)_a X_{4-a}$, wherein M is a early transition metal such as Ti, Zr, V, wherein $R^4$ is $C_1$-$C_{20}$ hydrocarbyl, X is halogen, and 0≤a≤4; a substituted aromatic compound containing nitrogen such as 2,6-dimethylpyridine; and an alkyl halide or aromatic halide compound having the formula $R^5X$.

As an illustrative embodiment, a catalyst precursor formation process is depicted with the following chemical equation:

$Mg \ + \ R^1_m Si(OR^2)_n \ + \ R^3_x SiX_y \ + \ MX_4 \ + \ M(OR^4)_4 \ +$

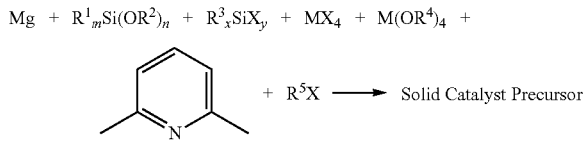

$+ \ R^5X \longrightarrow$ Solid Catalyst Precursor

The initial reaction temperature is typically from about 20 to about 200° C. and the reaction time is from about 0.5 to about 20 hours. More preferably, the initial reaction temperature is from about 75 to about 90° C. and the reaction time is from about 0.5 to about 1 hour. Then the reaction temperature normally is typically from about 20 to about 150° C. and the reaction time is typically about 0.5 to about 20 hours; more preferably, the temperature is about 75 to about 85° C. and the reaction time is from about 2 to about 4 hours. Another embodiment of the present invention may have a reaction time of about 3 hours to about 6 hours at about 80° C.

In one embodiment of the present invention, the molar ratio of compound $R^3_x SiX_y$ to $MX_4$ is typically about 0.1 to about 10, and preferably about 0.2 to about 2.5. The molar ratio of $R^1_m Si(OR^2)_n$ to Mg is typically about 0.01 to about 10, and preferably about 0.05 to about 2.5. The tetra-alkoxysilane compound to Mg molar ratio is typically about 0.01 to about 10, and preferably about 0.05 to about 2.5.

In one embodiment of the present invention, the ratio of transition metal compounds to Mg is typically about 0.01 to about 1, and preferably about 0.02 to about 0.5. The molar ratio of transition metal compound (such as 2,6-dimethylpyridine) is typically about 0.1 to about 5, preferably about 0.3 to about 1.5, and more preferably about 0.5 to about 1.0.

Solvents used in the present invention include aliphatic hydrocarbons such as hexane, heptane, octane, or decane; aromatic hydrocarbons such as toluene or xylene; alicyclic hydrocarbons such as cyclohexane, methylcyclohexane, or decalin; and ethers such as diethyl ether, diisopropyl ether, di-n-butyl ether, di-iso-butyl ether, diisoamyl ether, diallyl ether, tetrahydrofuran (THF), or anisole. Particularly preferred solvents are dibutyl ether, diisoamyl ether, hexane, heptane, toluene, and xylene, used either alone or as mixed solvents, depending on the specific reaction.

Any form of magnesium metal can be used in the present invention, but a preferred magnesium source is a finely divided metallic magnesium such as magnesium powder. The magnesium is heated under nitrogen prior to use to obtain a fast reaction. A small amount of iodine, alkyl-alcohol, and/or alkylhalide can be used to initiate or facilitate the reaction between the magnesium and alkyl/aromatic halide. An organomagnesium compound may also be employed instead of metallic magnesium, which has the empirical formula RMgX and/or RMgR', where R and R' are the same or different $C_2$-$C_{12}$ alkyl groups, preferably $C_4$-$C_{10}$ alkyl groups, more preferably $C_4$-$C_8$ alkyl groups, and most preferably both R and R' are butyl groups, and X is halogen.

Exemplary alkoxysilane compounds have a formula of $R^1_mSi(OR^2)_n$. Examples of preferred alkoxysilane compounds include: tetramethoxysilane, tetraethoxysilane, tetrabutoxysilane, tetraisobutoxysilane, tetraphenoxysilane, tetra(p-methylphenoxy)silane, tetrabenzyloxysilane, methyl-trimethoxysilane, methyltriethoxysilane, methyltributoxysilane, methyltriphenoxysilane, methyltriphenoxysilane, ethyltriethoxysilane, ethyltriisobutoxysilane, ethyltriphenoxysilane, butyltrimethoxysilane, butyltriethoxysilane, butyltributoxysilane, butyltriphenoxysilane, isobutyltriisobutoxysilane, vinyl triethyoxysilane, allyl-trimethoxysilane, phenyltrimethoxysilane, phenyltriethoxysilane, benzyl-triphenoxysilane, methyltriallyloxysilane, dimethyldimethoxysilane, dimethyl-diethoxysilane, dimethyl-diisopropyloxysilane, dimethyldibutoxysilane, dimethyldihexyloxysilane, dimethyldiphenoxy-silane, diethyldiethoxysilane, diethyl-diisobutoxysilane, diethyldiphenoxysilane, dibutyl-diisopropyloxysilane, dibutyl-dibutoxysilane, dibutyldiphenoxysilane, diisobutyldiethoxysilane, diisobutyl-diisobutoxysilane, diphenyldimethoxysilane, diphenyldiethoxysilane, diphenyl-dibutoxysilane, dibenzyldiethoxysilane, divinyl diphenoxysilane, diallyldipropoxysilane, diphenyldiallyloxysilane, methylphenyldimethoxysilane, chlorophenyldiethyoxysilane, polymethylhydrosiloxane, polyphenylhydrosiloxane, and combinations thereof.

Halogen-substituted silane has the formula $R^3_xSiX_y$, wherein $R^1$ is $C_1$-$C_{20}$ hydrocarbyl or substituted hydrocarbyl, X is halogen, x is 0-3, y is 1-4, and x+y=4. More than one hydrocarbyl group may be employed in the halogen-substituted silane, and more than one halogen may be employed in the halogen-substituted silane. Preferred halogen-substituted silane compounds include: silicon tetrachloride, tetrabromosilane, tetrafluorosilane, tetrachlorosilane, allyldichlorosilane, allyltrichlorosilane, benzyltrichlorosilane, bis(dichlorosilyl)methane, 2-bromoethyltrichlorosilane, t-butyldichloro-silane, t-butyltrichlorosilane, 2-(carbomethoxy)ethyltrichlorosilane, 2-chloroethylmethyldichlorosilane, 2-chloroethyltrichlorosilane, 1-chloroethyltrichlorosilane, chloromethylmethyl-dichlorosilane, ((chloromethyl)phenylethyl)trichlorosilane, chloromethyltrichlorosilane, 2-cyanoethylmethyldichlorosilane, cyclohexyl-trichlorosilane, cyclopentyltrichlorosilane, cyclotetramethylenedichlorosilane, cyclotrimethylenedichlorosilane, decylmethyldichlorosilane, dibenzyloxydichlorosilane, 1,5-dichlorohexamethyltrisiloxane, (dichloromethyl)trichlorosilane, dichlorosilane, 1,3-dichloro-tetramethyldisiloxane, diethoxydichlorosilane, ethylmethyl-dichlorosilane, ethyltrichlorosilane, heptyltrichlorosilane, hexachlorodisilane, hexachloro-disiloxane, isobutyltrichlorosilane, methyltrichlorosilane, octyltrichlorosilane, pentyltrichlorosilane, propyltrichlorosilane, and trichloromethyltrichlorosilane.

The halogenized transition metal compounds have chemical formulas of $MX_4$ and $M(OR^4)_4$, wherein $R^4$ is typically a hydrocarbon group having 1 to 20 carbon atoms, X is a halogen atom. The compound may contain a transition metal M from the Group 4 or 5 transitional metals as identified by the periodic table of the elements. M is preferably selected from Ti, Zr, and Hf. Mixtures of Group 4 and 5 transition metal compounds, preferably of titanium and vanadium, may be employed to control molecular weight and molecular weight distribution of the polymers produced. Of these compounds, Ti compounds (e.g., $TiX_4$ and $Ti(OR)_4$) are preferred. The transition metal compound employed in the present invention preferably is a halide, hydrocarbyloxide, or mixed halide/hydrocarbyloxide of titanium, zirconium, hafnium, vanadium.

Preferred R groups in the formula $M(OR^4)_4$ include alkyl groups such as methyl, ethyl, propyl, i-propyl, butyl, i-butyl, amyl, i-amyl, hexyl, heptyl, octyl, decyl and dodecyl groups; aryl groups such as phenyl, cresyl, xylyl and naphthyl groups; cycloalkyl groups such as cyclohexyl and cyclopentyl groups; alkenyl groups such as an allyl group; and aralkyl groups such as a benzyl group. Among these, alkyl groups having 2 to 18 carbon atoms and aryl groups having 6 to 18 carbon atoms are particularly suitable, and straight-chain alkyl groups having 2 to 18 carbon atoms are particularly suitable.

Preferred $Ti(OR^4)_4$ compounds include: tetra-n-butoxytitanium, tetra-isobutoxytitanium, tetra-sec-butoxytitanium, tetra-tert-butoxytitanium, tetra-n-pentyloxytitanium, tetracyclopentyloxytitanium, tetra-n-hexyloxytitanium, tetracyclohexyloxytitanium, tetra-n-heptyloxytitanium, tetra-n-octyloxy-titanium, tetra-2-ethylhexyloxytitanium, tetranonyloxytitanium, tetradecyloxytitanium, tetrai sobornyloxy-titanium, tetra-oleyloxytitanium, tetraallyloxytitanium, tetrabenzyloxytitanium, tetrabenzhydryloxytitanium, tetraphenoxytitanium, tetra-o-methylphenoxytitanium, tetra-m-methylphenoxytitanium, tetra-1-naphthyloxytitanium, tetra-2-naphthyloxytitanium, and mixtures thereof.

Examples of preferred aromatic compounds containing nitrogen are electron donors with strong Lewis base, selected from nitrogen-based compounds such as 2, 6-dimethylpyridine.

The substituted aromatic ring nitrogen compound is preferably employed in amounts sufficient to have a molar ratio of substituted aromatic ring nitrogen compound to transition metal compound (as added in the previous processing step) of typically from about 0.010:1 to about 50:1, preferably from about 0.02:1 to about 10:1, and more preferably from about 0.1:1 to about 5:1. Although the conditions are not generally critical, one acceptable procedure is to heat at about 80° C. for about 30 minutes to about 100 minutes, preferably about 60 minutes, until the desired temperature is obtained to yield third reaction complex C, which is generally a yellow/dark brown. The third reaction complex C is preferably used, for the following steps in situ without further separation or characterization.

Preferred substituted aromatic ring nitrogen compounds include substituted dipyridyl, pyrimidine, pyrazine, and terpyridine compounds, such as: 2,2'-dipyridyl, 6,6% dimethyl-2,2'-dipyridyl, 2,2'-diquinolyl, 4-(p-tolyl)-2,2':6',2"-terpyridine, 2,6-dimethylpyridine, 2,6-diisopropylpyridine, 2,6-ditertbutylpyridine, 2,4,6-trimethylsilylpyridine, 2,6-dimethoxypyridine, 2,6-bis(chloromethyl)-pyridine, 2,6-dimethypyrazine, 2,3,5-trimethylpyrazine, 2,4,6-trimethyl-s-triazine, 2,3,5,6-tetramethylpyrazine, pyrimidine, pyrazine, pentafluoropyridine, pentachloropyridine, 2,4,6-trimethylpyrimidine, 3-methylpyridazine, 2,6-dimethylpyridazine, 2,6-pyridinecarboxylic acid, 2,6-pyridinediacetate, 2,6-pyridinecarbonyl dichloride, 2,6-pyridinecarboxaldehyde, 2,6-pyridinedicarboxamide, 2,6-pyridinedimetanol, 2,6-pyridinediethanol, 2,6-diacetylpyridine, 2,6-Bis(chloromethyl) pyridine, 2,6-Bis(bromomethyl)pyridine, 2,6-pyridinecarbonitrile, and mixture thereof.

The alkyl or aromatic halide preferably has the formula $R^5X$, wherein $R^5$ is an alkyl group containing 3 to 20 carbon atoms or an aromatic group containing 6 to 18 carbon atoms, and X is preferably chlorine or bromine. Preferred alkyl and aromatic halides include: n-propyl chloride, propyl bromide, iso-propyl chloride, iso-propyl bromide, n-butyl chloride, n-butyl bromide, sec-butyl chloride, sec-butyl bromide, tert-butyl chloride, tert-butyl bromide, iso-amyl chloride, iso-amyl bromide, n-hexyl chloride, n-hexyl bromide, n-octyl chloride, n-octyl chloride, 2-ethylhexyl chloride, 2-ethylhexyl chloride, chlorobenzene, bromobenzene, and iodinebenzene. The Mg/RX molar ratio is typically about 0.2 to about 2, and preferably about 0.5 to about 1.2.

Catalyst System

The catalyst component of the present invention can be combined with an organo-aluminum compound to form a solid catalyst system for the polymerization of alpha-olefins. As explained herein, the solid catalyst system can be used for solution, slurry, and gas phase polymerization processes. Depending on the process, the catalyst can be introduced as a solid, with or without an inert support, or injected in the reaction zone in a pre-polymer form. Supported catalyst and pre-polymers are mostly indicated for gas phase and slurry processes.

The catalyst composition prepared as described above is filtered and washed, preferably once or more at a temperature of about 50° to 120° C., with a hydrocarbon (e.g., hexane), and then dried at 25° to 75° C. for about 1-5 hours.

The catalyst composition may be activated in situ by adding the co-catalyst and the solid catalyst composition separately to the polymerization medium. It is also possible to combine the catalyst composition and the co-catalyst before introduction into the polymerization medium, e.g., for up to about 2 hours at a temperature from about −40° to about 100° C. A suitable activating amount of the co-catalyst may be used. The number of moles of the co-catalyst per gram atom of titanium in the catalyst may be from about 0.05 to about 500.

Preferred co-catalysts include: organometallic compounds, for example, trialkylaluminum compounds such as trimethylaluminum, triethylaluminum, tri(n-propyl)aluminum, tri(isopropyl)aluminum, tri(n-butyl)aluminum, tri(isobutyl)aluminum, tri(t-butyl)aluminum, trihexylaluminum, triamyl-aluminum, and tri(n-octyl)aluminum; dialkylaluminum hydrides such as diisobutylaluminum hydride; dialkylaluminum halides such as dimethylaluminum chloride, diethylaluminum chloride, diisobutylaluminum chloride, di(t-butyl)aluminum chloride and diamylaluminum chloride; alkylaluminum dihalides such as methylaluminum dichlorides, ethylaluminum dichloride, isobutylaluminum dichloride, t-butylaluminum dichloride and amylaluminum dichloride; dialkylaluminum alkoxides such as diethylaluminum ethoxide; and alkylalumoxanes such as tetraethyldialumoxane, tetrabutyldialumoxane, methylalumoxane and ethylalumoxane. Among these organometallic compounds, trialkylaluminum, the mixture of the trialkylaluminum and dialkylaluminum halide, and alkylalumoxane are preferred, with trimethylaluminum, triethylaluminum, tri-iso-propylaluminum, and tri(n-octyl)aluminum being more preferred activators.

Polymerization/Copolymerization Process and Polymer Products

Ethylene and alpha-olefins may be copolymerized with the catalyst systems prepared accordance with the teachings of the present invention by any suitable process. Suitable polymerization processes include slurry phase, solution, gas phase, and a high pressure process, or any combination thereof. A desirable process is a gas phase polymerization of one or more one or more olefin monomers having from 2 to 30 carbon atoms, preferably from 2 to 12 carbon atoms, and more preferably from 2 to 8 carbon atoms. The ethylene copolymers prepared in accordance with the teachings of the present invention may be copolymers of ethylene with one or more $C_3$-$C_{10}$ alpha-olefins. Thus, copolymers having two types of monomeric units are possible as well as terpolymers having three types of monomeric units. Particular examples of such polymers include ethylene/1-butene copolymers, ethylene/1-hexene copolymers, ethylene/1-octene copolymers, ethylene/4-methyl-1-pentene copolymers, ethylene/1-butene/1-hexene terpolymers, ethylene/propylene/1-hexene terpolymers and ethylene/propylene/1-butene terpolymers. More preferred co-monomers are 4-methyl-1-pentene, 1-hexene, 1-octene and 1-butene for the catalyst prepared according to the present invention.

There are no particular restrictions on the polymerization conditions for production of polyolefins by the method of the invention, such as the polymerization temperature, polymerization time, polymerization pressure, monomer concentration, etc., but typically the polymerization temperature is from about −100° to about 300° C., the polymerization time is from about 10 seconds to about 20 hours, and the polymerization pressure is typically from normal pressure to about 350 psi. Hydrogen or the like may be used to adjust the molecular weight during polymerization. The polymerization may be carried out in a batch system, semi-continuous system, or continuous system, and it may be carried out in one or more stages under different polymerization conditions. The polyolefins may be directly obtained from a gas phase process, or obtained by isolation and recovery of solvent from a slurry or solution process.

In one embodiment of the present invention, the solid catalyst composition may be subjected to pre-polymerization, thereby obtaining a pre-polymerized catalyst component, which is then used for gas phase polymerization. In carrying out the pre-polymerization, for example, the solid catalyst component and an organoaluminum compound are contacted with an olefin. Examples of the olefin used for the pre-polymerization are ethylene, propylene and butene-1. The pre-polymerization may be either homopolymerization or copolymerization. In the pre-polymerization, it may be preferable to make a slurry containing the solid catalyst component using a solvent. Examples of suitable solvents include aliphatic hydrocarbons such as butane, pentane, hexane and heptane, and aromatic hydrocarbons such as toluene and xylene. The slurry concentration is typically from about 0.001 to 0.3 g-solid catalyst component/10 ml solvents, and preferably from about 0.02 to about 0.2 g-solid catalyst component/10 ml-solvent. The organoaluminum compound may be used in an amount typically from about 0.1 to about 100, and preferably from about 0.5 to about 50, calculated as the Al/Ti atomic ratio, i.e., the atomic ratio of the Al atom in the organoaluminum compound to the Ti atom in the solid catalyst component. The temperature for the pre-polymerization is typically from about −30° to about 100° C., and preferably from about −10° to 85° C. Yield of the pre-polymer is typically about 0.1 to 500 g, and preferably about 0.5 to about 50 g per mmol of Ti. When used for gas phase polymerization, the pre-polymerized solid catalyst component obtained may be combined with an inert diluent to form slurry, or dried to obtain a flowing powder. The prepolymer is injected into a gas phase reactor for further polymerization to produce a given LLDPE product.

Typically in a gas phase polymerization process a continuous cycle is employed wherein one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers in continuously cycled through a fluidized bed in the presence of a catalyst or prepolymer under reactive conditions. The gaseous stream is withdrawn from the fluidized bed and recycled back into the reactor. Simultaneously, polymer product is withdrawn from the reactor and fresh monomer is added to replace the polymerized monomer.

The ethylene partial pressure should vary between 10 and 250 psi, preferably between 65 and 150 psi, more preferably between 75 and 140 psi, and most preferably between 90 and 120 psi. More importantly, a ratio of comonomer to ethylene in the gas phase should vary from 0.0 to 0.50, preferably between 0.005 and 0.25, more preferably between 0.05 and 0.10, and most preferably between 0.10 and 0.15. Reactor pressure typically varies from 100 psi to 500 psi. In one aspect, the reactor pressure is maintained within the range of from 200 psi to 500 psi. In another aspect, the reactor pressure is maintained within the range of from 250 psi to 350 psi.

The catalysts prepared according to the present invention are particularly useful for the production of copolymers. Such copolymer resins may have a density of 0.958 g/cc or less, preferably 0.952 g/cc or less, or more preferably 0.940 g/cc or less. In accordance with certain aspects of the present invention, it is possible to achieve densities of less than 0.910 g/cc and even as low as 0.870 g/cc. Copolymer resins produced in accordance with the present invention preferably contain at least about 75 percent by weight of ethylene units. Preferably, the copolymer resins of the present invention contain at least 0.5 weight percent, for example from 0.5 to 25 weight percent of an alpha-olefin.

The molecular weight of the copolymers may be controlled in a known manner, preferably by using hydrogen. With the catalysts produced according to the present invention, molecular weight may be suitably controlled with hydrogen when the polymerization is carried out at temperatures from about 20° C. to about 300° C. This control of molecular weight may be evidenced by a measurable positive change of the melting index ($I_2$).

The molecular weight distribution (MWD) of the polymers prepared according to the present invention, as expressed by the MFR values, varies from about 10 to about 40. MFR is the ratio of the high-load melt index (HLMI or $I_{21}$) to the melt index (MI or $I_2$) for a given resin (MFR=$I_{21}/I_2$). The ethylene/1-hexene copolymer having a density of 0.910 g/cc to 0.930 g/cc, in a preferred embodiment, has a melt index ratio ($I_{21}/I_2$) of between about 20 to about 30.

The polymers of the present invention have a molecular weight distribution, a weight average molecular weight to number average molecular weight ($M_w/M_n$), of between about 2.5 to about 8.0, preferably between about 2.5 to about 4.5, more preferably between about 3.0 to about 4.0, and most preferably between about 3.2 to about 3.8. The polymers have a ratio (Mz/Mw) of z-average molecular weight (Mz) to weight average molecular weight of greater than 2.5. In one embodiment, this ratio is from about 2.5 and 3.8. In yet another embodiment, this ratio is from about 2.5 to about 3.5. In still yet another embodiment, this ratio is from about 2.5 to about 3.0. The ratio of z-average molecular weight to weight average molecular weight (Mz/Mw) reflects the inter- and/or intro-macromolecular entanglement and unique polymer rheology behavior.

Copolymer Compounding/Extrusion and LLDPE Pellets

The copolymers produced according to the teachings of the present invention may also be blended with additives to form compositions that can then be used in articles of manufacture. Those additives include antioxidants, nucleating agents, acid scavengers, plasticizers, stabilizers, anticorrosion agents, blowing agents, other ultraviolet light absorbers such as chain-breaking antioxidants, etc., quenchers, antistatic agents, slip agents, pigments, dyes and fillers and cure agents such as peroxide. These and other common additives in the polyolefin industry may be present in polyolefin compositions from 0.01 to 50 wt % in one embodiment, and from 0.1 to 20 wt % in another embodiment, and from 1 to 5 wt % in yet another embodiment, wherein a desirable range may comprise any combination of any upper wt % limit with any lower wt % limit.

In particular, antioxidants and stabilizers such as organic phosphites and phenolic antioxidants may be present in the polyolefin compositions from 0.001 to 5 wt % in one embodiment, and from 0.01 to 0.8 wt % in another embodiment, and from 0.02 to 0.5 wt % in yet another embodiment. Non-limiting examples of organic phosphites that are suitable are tris(2,4-di-tert-butylphenyl)phosphite (IRGAFOS 168) and tris(nonyl phenyl) phosphite (WESTON 399) Non-limiting examples of phenolic antioxidants include octadecyl 3,5 di-t-butyl-4-hydroxyhydrocinnamate (IRGANOX 1076) and pentaerythrityl tetrakis(3,5-di-tert-butyl-4-hydroxyphenyl)propionate (IRGANOX 1010); and 1,3,5-Tri(3,5-di-tert-butyl-4-hydroxybenzyl-isocyanurate (IRGANOX 3114).

Fillers and fatty acid salts may also be present in the polyolefin including LLDPE compositions. Filler may be present from 0.1 to 65 wt % in one embodiment, and from 0.1 to 45 wt % of the composition in another embodiment, and from 0.2 to 25 wt % in yet another embodiment. Desirable fillers include but not limited to titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, clays, alumina, and other metal oxides and carbonates, metal hydroxides, chrome, phosphorous and brominated flame retardants, antimony trioxide, silica, silicone, and blends thereof. These fillers may particularly include any other fillers and porous fillers and supports known in the art.

Fatty acid salts may be present from 0.001 to 6 wt % of the composition in one embodiment, and from 0.01 to 2 wt % in another embodiment. Examples of fatty acid metal salts include lauric acid, stearic acid, succinic acid, stearyl lactic acid, lactic acid, phthalic acid, benzoic acid, hydroxystearic acid, ricinoleic acid, naphthenic acid, oleic acid, palmitic acid, and erucic acid, suitable metals including Li, Na, Mg, Ca, Sr, Ba, Zn, Cd, Al, Sn, Pb and so forth. Desirable fatty acid salts are selected from magnesium stearate, calcium stearate, sodium stearate, zinc stearate, calcium oleate, zinc oleate, and magnesium oleate.

In the physical process of producing the blend of polyolefin and one or more additives, sufficient mixing should take place to assure that a uniform blend will be produced prior to conversion into a finished product. The polyolefin can be in any physical form when used to blend with the one or more additives. In one embodiment, reactor granules, defined as the granules of polymer that are isolated from the polymerization reactor, are used to blend with the additives. The reactor granules have an average diameter of from 10 μM to 5 mm and from 50 μM to 10 mm in another embodiment. Alternately, the polyolefin is in the form of pellets, such as, for example, having an average diameter of from 1 mm to 6 mm that are formed from melt extrusion of the reactor granules.

One method of blending the additives with the polyolefin is to contact the components in a tumbler or other physical blending means, the polyolefin being in the form of reactor granules. This can then be followed, if desired, by melt blending in an extruder. Another method of blending the components is to melt blend the polyolefin pellets with the additives directly in an extruder, Brabender or any other melt blending means.

Film Extrusion and Film Properties

The polymers produced are more easily extruded into film products by cast or blown film processing techniques as compared to commercial Super-hexene (I) and (II), commercial octene-1 LLDPE (I) and (II), and commercial mLLDPE (I), (II) and (III) of comparable melt index and density. The resins in this invention have, for a comparable MI, a MWD narrower than hexene copolymer resins but broader than mLLDPEs. The resins made from this invention also exhibit a molecular structure such as comonomer distribution very similar to typical mLLDPE resins.

More specifically, in the present invention, using Davis-Standard blown film pilot line evaluates the film extrusion processability and film performance of new LLDPE with novel composition distribution against the industry leading products: i.e., $SC_6$, $C_8$ and mLLDPE products. The film process conditions in Davis-Standard blown film pilot include 90-mil die gap, at 2.5 BURs, 1-mil gages and 12 lbs/hr/in (450 lbs/hr). Film dart impact (g/mil) was tested by ASTM D-1709, and film Elmendorf Tear (g/mil) by ASTM-D-1922 and Secant Modulus by ASTM D-882.

EXAMPLES

In order to provide a better understanding of the foregoing discussion, the following non-limiting examples are offered. Although the examples may be directed to specific embodiments, they are not to be viewed as limiting the invention in any specific respect.

All parts, proportions, and percentages are by weight unless otherwise indicated. All examples were carried out in dry, oxygen-free environments and solvents. Ti, Si, and Mg content in the solid catalyst component were determined by ICP emission analysis method. Melt flow index (MI) of polymer was measured at 190° C., according to ASTM D1238. Melt flow ratio (MFR), which is the ratio of high melt flow index (HLMI or $I_{21}$) to melt index (MI or $I_2$), was used as a measure of melt fluidity and a measure of the molecular weight distribution of polymer. The melt flow ratio is believed to be an indication of the molecular weight distribution of the polymer, the higher the value, the broader the molecular weight distribution. Density was measured according to ASTM D 1505-98. All molecular weights are weight average molecular weight unless otherwise noted. Molecular weights (weight average molecular weight ($M_w$) and number average molecular weight ($M_e$) and ($M_z$) were measured by Gel Permeation Chromatography (GPC). The melting point of polymers was measured by DSC. Composition distribution or short chain branching distribution of polymers, and comonomer content and molecular weight in each fractionated fraction were determined by TREF and GPC-FTIR at a high temperature of 145° C., flow rate of 0.9 mL/min, solvent of TCB, and the concentration of solution of 2.5 mg/mL.

Catalyst Preparation

The solid catalyst composition and properties of polymers in the examples were measured according to the following methods:

Anhydrous hexane (2 L), magnesium (31.9 g), iodine (3.3 g), isopropanol (3.66 ml), and butyl chloride (5.8 ml) were successively charged into a 5 L reactor equipped with an anchor stirrer driven by a magnetic motor. The reactor was heated to 85° C. within 60 minutes and then cooled to 80° C. within 20 minutes. Tetraethoxy orthosilicate (20 ml, 89.7 mmol) and silicon tetrachloride (40 ml, 349.1 mmol) were added to the reactor and held for reaction at 80° C. for 20 minutes. $Ti(OPr)_4$ (46.1 ml, 166.9 mmol) and $TiCl_4$ (18.3 ml, 166.9 mmol) were charged to the reactor under nitrogen at 80° C., and the slurry mixture was stirred for 0.5 hour, followed by the introduction of 2,6-dimethylpyridine (19.5 ml, 166.9 mmol) in the hexane solution. The reaction was stirred at 80° C. for 1 hour to yield a brown/yellow reaction product, which was used without further separation.

The brown/yellow reaction product was then directly supported with magnesium/silicon composite support, which was prepared in-situ by the slow introduction of n-butyl chloride (213.3 ml, 2041.5 mmol) into the brown/yellow reaction product over 4 hours at 80° C. After the addition of n-butyl chloride, the reaction mixture was continually stirred at 80° C. for 2 more hours and then cooled to temperature of 50° C. The resulting precipitate was rapidly washed 3 times with 2L hexane at 50° C. A solid magnesium-based supported titanium catalyst component was obtained. Analysis shows that the red/brown catalyst component contains 7.5 wt % Ti, 2.1 wt % Si, and 14.5 wt % Mg, respectively.

Polymerization

The ethylene/1-hexene copolymers from Examples 1-6 were produced in accordance with the following general procedure. Polymerization was conducted in a commercial BP process gas-phase fluidized bed reactor operating at approximately 300 psig total pressure. Fluidizing gas was passed through the bed at a velocity of approximately 1.8 feet per second. The fluidizing gas exiting the bed entered a resin disengaging zone located at the upper portion of the reactor. The fluidizing gas then entered a recycle loop and passed through a cycle gas compressor and water-cooled heat exchanger. The shell side water temperature was adjusted to maintain the reaction temperature to the specified value in the range of from 175° F. to 195° F. Ethylene, hydrogen, 1-hexene and nitrogen were fed to the cycle gas loop just upstream of the compressor at quantities sufficient to maintain the desired gas composition. Gas compositions were measured by an on-line GC analyzer. The catalyst in the form of prepolymer was injected to the reactor bed through a stainless steel injection tube at a rate sufficient to maintain the desired polymer production rate. Nitrogen gas was used to disperse the catalyst into the reactor. Product was withdrawn from the reactor, polymer was collected after discharging and degassing in the downstream, gases were recycled in the loops and residual catalyst and cocatalyst in the resin was deactivated with a wet nitrogen purge. Final powder product (polymer) was transferred into extrusion and pelletized into granular product. Table 1 summarizes the reaction conditions.

Granular product for Examples 1-6 was screened and dry-blended with suitable additives such as Irganox-1076 (available from Ciba-Geigy) 1076, IR-168, TNPP, Polybloc Talc, Zinc stearate, Erucamide, and DHT-4V. Pelletizing of Examples 1-4 was carried out on a twin-screw extruder equipped with an underwater pelletizer. Output rate was approximately 35,000-50,000 lb/hr and melting temperature was 231° C. (447° F.).

TABLE 1

Reaction Conditions for Examples 1-6

| | Examples | | | | | |
|---|---|---|---|---|---|---|
| | 1 | 2 | 3 | 4 | 5 | 6 |
| C2 Production rate, lb/hr | 38,000 | 40,000 | 45,000 | 48,000 | 50,000 | 50,000 |
| Operating pressure, psi | 285 | 285 | 285 | 285 | 285 | 305 |
| C2 partial pressure, psi | 90 | 95 | 100 | 105 | 105 | 125 |
| C2/H2 ratio | 0.245 | 0.241 | 0.235 | 0.230 | 0.250 | 0.230 |
| C6/C2 ratio | 0.1215 | 0.1215 | 0.1215 | 0.1255 | 0.115 | |
| C4/C2 ratio | | | | | | 0.32 |
| Reaction temp., ° F. | 185 | 185 | 185 | 185 | 185 | 185 |
| Res. Time, hr | 4.5 | 4.5 | 4.5 | 4.5 | 4.3 | 4.0 |
| $I_2$, dg/min (powder) | 0.80 | 0.8 | 0.8 | 0.8 | 1.0 | 1.0 |
| Powder density, g/cc | 0.9160 | 0.9155 | 0.9158 | 0.9150 | 0.9190 | 0.9175 |

Comonomer Composition Distribution

The distribution of the short chain branches can be clearly measured, for example, using Temperature Raising Elution Fractionation (TREF) and GPC to determine the weight average molecular weight of the molecules eluted from the TREF column at a given temperature. The use of TREF, GPC-LS and FTIR yields information about the breadth of the composition distribution and whether the comonomer content increases, decreases, or is uniform across the chains of different molecular weights. Short chain branching distribution (SCBD) for comparatives samples are showed in FIGS. 1, 2 and 3. The copolymers have a novel composition distribution in which commoners are incorporated into the high molecular weight polymer molecules and distributed about evenly among the entire polyethylene chains with substantial absence of low molecular weight polymer molecules. The resins having a novel composition distribution exhibit a global composition distribution which is comparable to homogeneous mLLDPE, but differ from broad composition distribution of typically conventional ZN-LLDPE as well as Super-hexene Z-N LLDPE. However, as shown in FIG. 4, the resins having a novel composition distribution of this invention exhibit a TREF fractionation distribution which is noticeably different from that of mLLDPE. But unlike the conventional LLDPE, the molecular weight (Mw) of each TREF soluble fraction of this invention was found comparable among one another and with substantial absence of low molecular weight polymer molecules. As shown in FIG. 5, the resins having a novel composition distribution of this invention exhibit a unique correlation between polymer density and polymer melting point which is comparable to conventional LLDPE but substantially more level than that of the mLLDPE.

Polymer Properties and Blown Film Properties

Polymer that characterized by DSC and GPC were extruded using Davis-Standard Blown Film Pilot Line. The film process conditions in Davis-Standard blown film pilot include 90-mil die gap, at 2.5 BURs, 1-mil gages and 12 lbs/hr/in (450 lbs/hr). Extrusion melt temperatures in extruder A, extruder B and extruder C are about 438° F., 439° F., and 435° F.

Comparative Example 6 is commercial super-hexene (I). Comparative Example 7 is commercial super-hexene (II). Comparative Example 8 is commercial octane-1 LLDPE (I). Comparative Example 9 is commercial octane-1 LLDPE (II). Comparative Example 10 is commercial mLLDPE (I). Comparative Example 11 is commercial mLLDPE (II). Comparative Example 12 is commercial mLLDPE (III). The polymer and blown film properties and extrusion data are shown in Tables 2-4.

As shown in the Tables 2-4 above, the resins having a novel composition distribution exhibit a global intermolecular compositional distribution similar to mLLDPE, but accompanied with high distinctive crystallinity and high melting point. The resins having a novel compositional distribution have controlled molecular weight distribution which is narrower than conventional ZN-LLDPE but broader than mLLDPE. The resins having a novel compositional distribution exhibit, in addition to a good processability, a superior balance of physical properties such as stiffness and tear strength of ZN-catalyzed ethylene-alpha olefin copolymers with the toughness (e.g. dart impact) strength of single-site catalyzed ethyelene compolymers. More specifically speaking, the film properties of the resins having a novel composition distribution exhibit excellent mechanical properties such as dart impact, MD tear, and tensile strength, superior than those of ExxonMobil and Nova super hexene products. The films have dart impact equivalent to C8 products and single-site catalyzed PE resins in toughness such as dart impact, but having high MD tear tensile properties imported from Ziegler-Natta type polymers. A film provided includes a 2% secant modulus of from 18,000 to 28,000 psi, a heat seal strength of greater than 1300 g/inch, a dart impact resistance of greater than 500 g/mil, and MD tear strength of at least 450 g/mil.

TABLE 2

Blown Film Properties Comparison for Ziegler-Natta C6-LLDPE

| | Example 1 | Example 4 | Comparative Example 6 Super-Hexene (I) | Comparative Example 7 Super Hexene (II) |
|---|---|---|---|---|
| MI ($I_2$) dg/min | 0.76 | 0.91 | 0.95 | 0.72 |
| MFR ($I_{21}/I_2$) | 25 | 27 | 25 | 28 |
| $M_w/M_n$ | 3.5 | 3.8 | 3.8 | 4.3 |
| Resin Density (g/cc) | 0.9205 | 0.9201 | 0.9215 | 0.9206 |
| Melt Point (° C.) | 125 | 125 | 124 | 123 |
| Film Gauge Target (mils) | 1.00 | 1.00 | 1.00 | 1.00 |

TABLE 2-continued

Blown Film Properties Comparison for Ziegler-Natta C6-LLDPE

|  | Example 1 | Example 4 | Comparative Example 6 Super-Hexene (I) | Comparative Example 7 Super Hexene (II) |
|---|---|---|---|---|
| Blow UP Ratio (BUR) | 2.5 to 1 | 2.5 to 1 | 2.5 to 1 | 2.5 to 1 |
| TEAR STRENG MD, g/mil | 465 | 625 | 413 | 357 |
| TEAR STRENG TD, g/mil | 647 | 705 | 712 | 659 |
| DART IMPACT, g/mil | 538 | 505 | 293 | 409 |
| FILM HAZE, % | 38 | 21 | 37 | 39 |
| Tensile Str. @ Brk (MD), psi | 5677 | 5680 | 5395 | 6379 |
| Tensile Str. @ Brk (TD), psi | 4989 | 4293 | 4347 | 4133 |
| Film Elongation @ Brk (MD) % | 672 | 703 | 691 | 651 |
| Film Elongation @ Brk (TD) % | 884 | 870 | 915 | 844 |
| (MD) SEC. MOD @ % STRN, % | 18311 | 23999 | 18693 | 17500 |
| (TD) SEC. MOD @ % STRN, % | 18994 | 29814 | 19837 | 18266 |
| % STRAIN, % | 2 | 1 | 2 | 1 |
| (MD) TENSILE STR @YlD, psi | 1529 | 1656 | 1388 | 1436 |
| (TD) TENSILE STR @YlD, psi | 1533 | 11637 | 1339 | 1392 |
| Extrusion Parameters: |  |  |  |  |
| Melt Temperature (° F.) | 423 | 413 | 420 | 433 |
| Head Pressure (psi) | 3989 | 3724 | 3741 | 4123 |
| Die Pressure (psi) | 2425 | 2191 | 2265 | 2491 |
| Motor Load (amps) | 64.1 | 60.3 | 63.2 | 70.3 |

TABLE 3

Blown Film Properties Comparison with C8-LLDPE

|  | Example 1 | Example 4 | Comparative Example 8 C8 LLDPE (I) | Comparative Example 9 C8 LLDPE (II) |
|---|---|---|---|---|
| MI ($I_2$) dg/min | 0.76 | 0.91 | 0.98 | 0.98 |
| MFR ($I_{21}/I_2$) | 25 | 27 | 28 | 29 |
| $M_w/M_n$ | 3.5 | 3.8 | 3.7 | 4.1 |
| Resin Density (g/cc) | 0.9205 | 0.9201 | 0.9217 | 0.9215 |
| Melt Point (° C.) | 125 | 125 | 118 | 121 |
| Film Gauge Target (mils) | 1.00 | 1.00 | 1.00 | 1.00 |
| Blow UP Ratio (BUR) | 2.5 to 1 | 2.5 to 1 | 2.5 to 1 | 2.5 to 1 |
| TEAR STRENG MD, g/mil | 465 | 625 | 355 | 319 |
| TEAR STRENG TD, g/mil | 647 | 705 | 709 | 750 |
| DART IMPACT, g/mil | 538 | 505 | 200 | 257 |
| FILM HAZE, % | 38 | 21 | 25 | 26 |
| Tensile Str. @ Brk (MD), psi | 5677 | 5680 | 4268 | 5688 |
| Tensile Str. @ Brk (TD), psi | 4989 | 4293 | 2859 | 4470 |
| Film Elongation @ Brk (MD) % | 672 | 703 | 583 | 618 |
| Film Elongation @ Brk (TD) % | 884 | 870 | 697 | 865 |
| (MD) SEC. MOD @ % STRN, % | 18311 | 23999 | 22604 | 21504 |
| (TD) SEC. MOD @ % STRN, % | 18994 | 29814 | 27532 | 22439 |
| % STRAIN, % | 2 | 1 | 2 | 2 |
| (MD) TENSILE STR @YlD, psi | 1529 | 1656 | 1614 | 1708 |
| (TD) TENSILE STR @YlD, psi | 1533 | 11637 | 1588 | 1482 |
| Extrusion Parameters: |  |  |  |  |
| Melt Temperature (° F.) | 423 | 413 | 433 | 420 |
| Head Pressure (psi) | 3989 | 3724 | 4123 | 3741 |
| Die Pressure (psi) | 2425 | 2191 | 2491 | 2265 |
| Motor Load (amps) | 64.1 | 60.3 | 70.3 | 63.2 |

TABLE 4

Blown Film Properties Comparison with mLLDPE

|  | Example 1 | Comparative Example 10 mLLDPE (I) | Comparative Example 11 mLLDPE (II) | Comparative Example 12 mLLDPE (III) |
|---|---|---|---|---|
| MI ($I_2$) dg/min | 0.76 | 0.93 | 1.11 | 1.01 |
| MFR ($I_{21}/I_2$) | 25 | 15 | 13 | 17 |
| $M_w/M_n$ | 3.5 | 2.7 | 2.3 | 2.6 |
| Resin Density (g/cc) | 0.9205 | 0.9223 | 0.9174 | 0.9206 |
| Melt Point (° C.) | 125 | 118 | 116 | 118 |

TABLE 4-continued

Blown Film Properties Comparison with mLLDPE

|  | Example 1 | Comparative Example 10 mLLDPE (I) | Comparative Example 11 mLLDPE (II) | Comparative Example 12 mLLDPE (III) |
| --- | --- | --- | --- | --- |
| Film Gauge Target (mils) | 1.00 | 1.00 | 1.00 | 1.00 |
| Blow UP Ratio (BUR) | 2.5 to 1 | 2.5 to 1 | 2.5 to 1 | 2.5 to 1 |
| TEAR STRENG MD, g/mil | 465 | 298 | 205 | 241 |
| TEAR STRENG TD, g/mil | 647 | 406 | 380 | 381 |
| DART IMPACT, g/mil | 538 | 513 | 448 | 633 |
| Tensile Str. @ Brk (MD), psi | 5677 | 3587 | 5611 | 3342 |
| Tensile Str. @ Brk (TD), psi | 4989 | 3122 | 5738 | 2439 |
| Film Elongation @ Brk (MD) % | 672 | 528 | 603 | 532 |
| Film Elongation @ Brk (TD) % | 884 | 600 | 769 | 543 |
| (MD) SEC. MOD @ % STRN, % | 18311 | 21257 | 19583 | 19174 |
| (TD) SEC. MOD @ % STRN, % | 18994 | 21051 | 21443 | 19326 |
| % STRAIN, % | 2 | 2 | 2 | 2 |
| (MD) TENSILE STR @YlD, psi | 1529 | 1714 | 1791 | 1520 |
| (TD) TENSILE STR @YlD, psi | 5677 | 1590 | 1530 | 1455 |
| Extrusion Parameters: | | | | |
| Melt Temperature (° F.) | 423 | 433 | 428 | 428 |
| Head Pressure (psi) | 3989 | 4123 | 3941 | 3941 |
| Die Pressure (psi) | 2425 | 2491 | 2525 | 2525 |
| Motor Load (amps) | 64.1 | 70.3 | 69.2 | 69.2 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings therein. Furthermore, no limitations are intended to the details of construction or design herein shown, other than as described in the claims below. It is therefore evident that the particular illustrative embodiments disclosed above may be altered or modified and all such variations are considered within the scope and sprit of the present invention. Unless otherwise indicated, all numbers expressing quantities of ingredients, properties, reaction conditions, and so forth, used in the specification and claims are to be understood as approximations based on the desired properties sought to be obtained by the present invention, and the error of measurement, etc., and should at least be construed in light of the number of reported significant digits and by applying ordinary rounding techniques. Whenever a numerical range with a lower limit and an upper limit is disclosed, and number falling within the range is specifically disclose. Moreover, the indefinite articles "a" or "an", as use in the claims, are defined herein to mean one or more than one of the element that it introduces.

What is claimed is:

1. A Ziegler-Natta catalyzed ethylene alpha-olefin copolymer, further comprising:
a density of between 0.900 g/cc and 0.930 g/cc;
a melt index ratio ($I_{21}/I_2$) of between 20 and 35 dg/min;
a melt index ($I_2$) of between 0.1 and 10 dg/min; and
a polydispersity index (Mw/Mn) of between 3.0 and 5.0;
wherein the Temperature Raising Elution Fractionation (TREF) fraction distribution of the copolymer has at least 15 wt % of TREF fractions below an elution temperature of 35° C.; and
wherein the copolymer is produced by reacting ethylene and an alpha-olefin comonomer in the presence of a titanium-based Ziegler-Natta catalyst in a gas-phase process at reaction temperatures in the range of about 50° C. to about 100° C.

2. The copolymer of claim 1, wherein the melting point of the copolymer is in the range of from about 124° C. to about 127° C. over the density range of 0.900 g/cc to 0.930 g/cc.

3. The copolymer of claim 1, wherein the molecular weight of the copolymer is substantially constant over the entire TREF fraction distribution.

4. The copolymer of claim 1, wherein the molecular weight (Mw) of the copolymer satisfies the formula: (Mw of 35° C.)/(Mw of 100° C.) =1.0 to 1.5.

5. The copolymer of claim 1, wherein the copolymer has a homopolymer content less than 10 wt %.

6. The copolymer of claim 1, wherein the TREF fraction distribution of the copolymer is substantially evenly distributed across the elution temperature range from about 35° C. to about 100° C.

7. The copolymer of claim 1, wherein the copolymer exhibits a uniform comonomer distribution across its molecular weight.

8. The copolymer of claim 1, wherein the melt index ratio of ($I_{21}/I_2$) is between 20 and 30 dg/min.

9. The copolymer of claim 1, wherein the polydispersity index is between 3.0 and 4.5.

10. The copolymer of claim 1, wherein the polydispersity index is between 3.0 and 4.0.

11. The copolymer of claim 1, wherein the polydispersity index is between 3.2 and 3.8.

12. The copolymer of claim 1, wherein the polymers have a ratio (Mz/Mw) of z-average molecular weight (Mz) to weight molecular weight (Mw) of greater than 2.5.

13. The copolymer of claim 1, wherein the ratio (Mz/Mw) is between 2.5 and 3.8.

14. The copolymer of claim 1, wherein the ratio (Mz/Mw) is between 2.5 and 3.5.

15. The copolymer of claim 1, wherein the ratio (Mz/Mw) is between 2.5 and 3.0.

16. The copolymer of claim 1, wherein a blown film with 25 μm thickness prepared by extruding the copolymer has a dart impact resistance of greater than 500 g/mil.

17. The copolymer of claim 1, wherein a blown film with 25 μm thickness prepared by extruding the copolymer has a MD tear strength of greater than 450 g/mil.

18. The copolymer of claim 1, wherein the melting point is in the range of 124° C. to 126° C. over the density range of 0.9140 to 0.9250 g/cc.

19. The copolymer of claim 1, wherein the copolymer is produced by reacting ethylene and a comonomer in the presence of a titanium-based Ziegler-Natta catalyst and an alkylaluminum co-catalyst at a temperature in the range of 50° C. to 100° C., an ethylene partial pressure of from 10 psi and 350 psi, and a comonomer to ethylene ratio of from 0.01 to 0.50.

20. The copolymer of claim 1, wherein alpha-olefin comonomer is selected from 1-hexene, 1-octene and 1-butene.

21. The copolymer of claim 1, wherein the titanium-based Ziegler-Natta catalyst comprising:
   a. magnesium;
   b. a compound having the formula $R^1_m Si(OR^2)_n$, wherein $R^1$ and $R^2$ are $C_1$-$C_{20}$ carbon atoms, m=0-3, n=1-4, and m+n=4, and wherein each $R^1$ and each $R^2$ may be the same or different;
   c. a compound having the formula $R^3_x SiX_y$, wherein $R^3$ is $C_1$-$C_{20}$ carbon atoms, X is halogen, x =0-3, y=1-4, and x+y=4, and wherein each X and each $R^3$ may be the same or different;
   d. a compound having the formula $MX_4$ and $M(OR^4)X_4$, wherein M is a titanium, wherein $R^4$ is $C_1$-$C_{20}$ carbon atoms, X is halogen, and wherein each $R^4$ may be the same or different;
   e. a substituted aromatic nitrogen compound; and
   f. an alkyl halide or aromatic halide compound having the formula $R^5 X$, wherein $R^5$ is an alkyl group containing 3 to 20 carbon atoms or an aromatic group containing 6 to 18 carbon atoms, and X is selected from chlorine and bromine.

* * * * *

UNITED STATES PATENT AND TRADEMARK OFFICE
CERTIFICATE OF CORRECTION

PATENT NO. : 8,993,693 B2
APPLICATION NO. : 13/429013
DATED : March 31, 2015
INVENTOR(S) : Honglan Lu and Guangxue Xu It is certified that error appears in the above-identified patent and that said Letters Patent is hereby corrected as shown below:

In the claims

At column 20, line 32, cancel the text beginning with "4. The copolymer of claim 1" to and ending "= 1.0 to 1.5." at column 20, line 34, and insert the following claim:

--4. The copolymer of claim 1, wherein the molecular weight (Mw) of the copolymer satisfies the formula: (Mw of 100°C.)/ (Mw of 35°C.) = 1.0 to 1.5.--

Signed and Sealed this
Eighteenth Day of August, 2015

Michelle K. Lee
*Director of the United States Patent and Trademark Office*